United States Patent [19]

Hampton

[11] Patent Number: 5,431,410
[45] Date of Patent: Jul. 11, 1995

[54] BALL TARGET GAME WITH AIR-OPERATED GUNS

[76] Inventor: Terry Hampton, 404 E. Jackson, Tekonsha, Mich. 49092

[21] Appl. No.: 283,523

[22] Filed: Aug. 1, 1994

[51] Int. Cl.⁶ .................. F41B 11/02; B65G 53/14
[52] U.S. Cl. .................... 273/397; 124/72; 406/68; 406/153
[58] Field of Search .......... 273/317, 352, 397; 124/71, 72; 406/52, 63, 68, 153

[56] References Cited

U.S. PATENT DOCUMENTS

| | | | |
|---|---|---|---|
| 2,314,031 | 3/1943 | Colburn | 406/63 |
| 3,178,235 | 4/1965 | Zimmerman | 406/63 |
| 4,123,059 | 10/1978 | Guibas | 273/397 X |
| 4,185,824 | 1/1980 | Natwick | 273/397 X |
| 4,215,867 | 8/1980 | Natwick | 273/397 X |
| 5,251,906 | 10/1993 | Heller et al. | 273/397 |

Primary Examiner—William H. Grieb
Attorney, Agent, or Firm—Barnes, Kisselle, Raisch, Choate, Whittemore & Hulbert

[57] ABSTRACT

A ball game includes a target area, at least one gun responsive to an operator for firing balls into the target area, and a device for feeding balls in sequence to the gun. This device includes an opening disposed beneath the target area for receiving balls that fall by gravity from the target area, and a turret positioned beneath the opening and having a circumferential array of peripheral openings each sized to receive one of the balls. The turret is rotated about its axis such that balls that fall by gravity onto the turret are urged by centrifugal force toward the peripheral openings. An accelerator has a ball inlet disposed beneath the turret at a position for alignment with each of the peripheral openings in sequence as the turret rotates, and an air inlet connected to a source of air under pressure. The accelerator is so constructed that flow of air under pressure through the air inlet assists force of gravity in drawing balls into the accelerator ball inlet from the turret peripheral openings, and accelerates the balls during passage through the accelerator toward the accelerator outlet. The accelerator outlet is connected to one of the guns so as to feed to the gun balls accelerator in sequence by the accelerator.

20 Claims, 4 Drawing Sheets

BALL TARGET GAME WITH AIR-OPERATED GUNS

The present invention is directed to ball target games of a type employed in carnivals, fairs and amusement parks, and more particularly to a device employing air pressure for feeding the balls to the guns.

BACKGROUND AND SUMMARY OF THE INVENTION

Ball target games are common in carnivals, fairs, and amusement parks. Balls are fed in sequence to contestant guns, which are aimed at targets in a target area. A general object of the present invention is to provide a device for retrieving the balls from the target area, and for accelerating the balls while feeding the same to the guns. More specifically, it is an object of the present invention to provide a device of the described character that is adapted to be disposed entirely beneath the target area, and is thereby particularly well-suited for use in both permanent and portable game installations, that handles the balls in such a way as to minimize jamming or breakdown, thereby putting at least one of the guns out of service and costing the operator contestant fees, that can be readily adjusted by an operator for controlling both velocity and frequency of ball firing from the guns, that can be readily turned on and off by an operator so as to save energy when not in use while at the same time being immediately ready for use when desired, and that is designed to provide reliable operation over an extended operating life. Another object of the present invention is to provide a device of the described character that can be employed in connection with balls of differing sizes, and that employs compressed air for accelerating the balls.

A ball game in accordance with the present invention includes a target area, at least one gun responsive to an operator for firing balls into the target area, and a device for feeding balls in sequence to the gun. In accordance with the presently preferred embodiment of the invention, this device comprises an opening disposed beneath the target area for receiving balls that fall by gravity from the target area, and a turret positioned beneath the opening and having a circumferential array of peripheral openings each sized to receive one of the balls. The turret is rotated about its axis such that balls that fall by gravity onto the turret are urged by centrifugal force toward the peripheral openings. An accelerator has a ball inlet disposed beneath the turret at a position for alignment with each of the peripheral openings in sequence as the turret rotates, and an air inlet connected to a source of air under pressure. The accelerator is so constructed that flow of air under pressure through the air inlet assists force of gravity in drawing balls into the accelerator ball inlet from the turret peripheral openings, and accelerates the balls during passage through the accelerator toward the accelerator outlet. The accelerator outlet is connected to one of the guns so as to feed to the gun balls accelerated in sequence by the accelerator.

A funnel is positioned above the turret in the preferred embodiment of the invention for feeding balls that fall by gravity onto the turret radially inwardly of the peripheral openings, so that the balls migrate radially outwardly on the turret toward the peripheral openings while at the same time assuming a generally planar disposition on the surface of the turret. A cylindrical wall surrounds the periphery of the turret to prevent balls from falling off the turret, and a bracket is disposed on the wall in alignment with the accelerator ball inlet to prevent passage of more than one ball to the accelerator through each peripheral opening as it aligns with the accelerator inlet. The accelerator in the preferred embodiment of the invention comprises a cylindrical tube having a plurality of air jet passages extending through the tube at an acute angle to the inlet end of the tube, and at a tangential angle to the axis of the tube for imparting spin to the balls as they are accelerated through the tube. A collar surrounds the tube, and has an open internal recess that communicates with the air jet passages and an air inlet fitting for connection to the air pressure source.

The air pressure source in the preferred embodiment of the invention comprises a compressor that is connected to the accelerator air inlet through a pressure regulator that is adjustable for adjusting acceleration imparted to the balls as they are accelerated through the tube. The turret is rotated by a variable speed electric motor that is adjustable for adjusting timing between balls fed to the accelerator, and from the accelerator through a flexible hose to the gun. In the disclosed embodiment of the invention, there are a plurality of contestant guns, and a corresponding plurality of turrets, etc. each individually associated with one of the guns.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
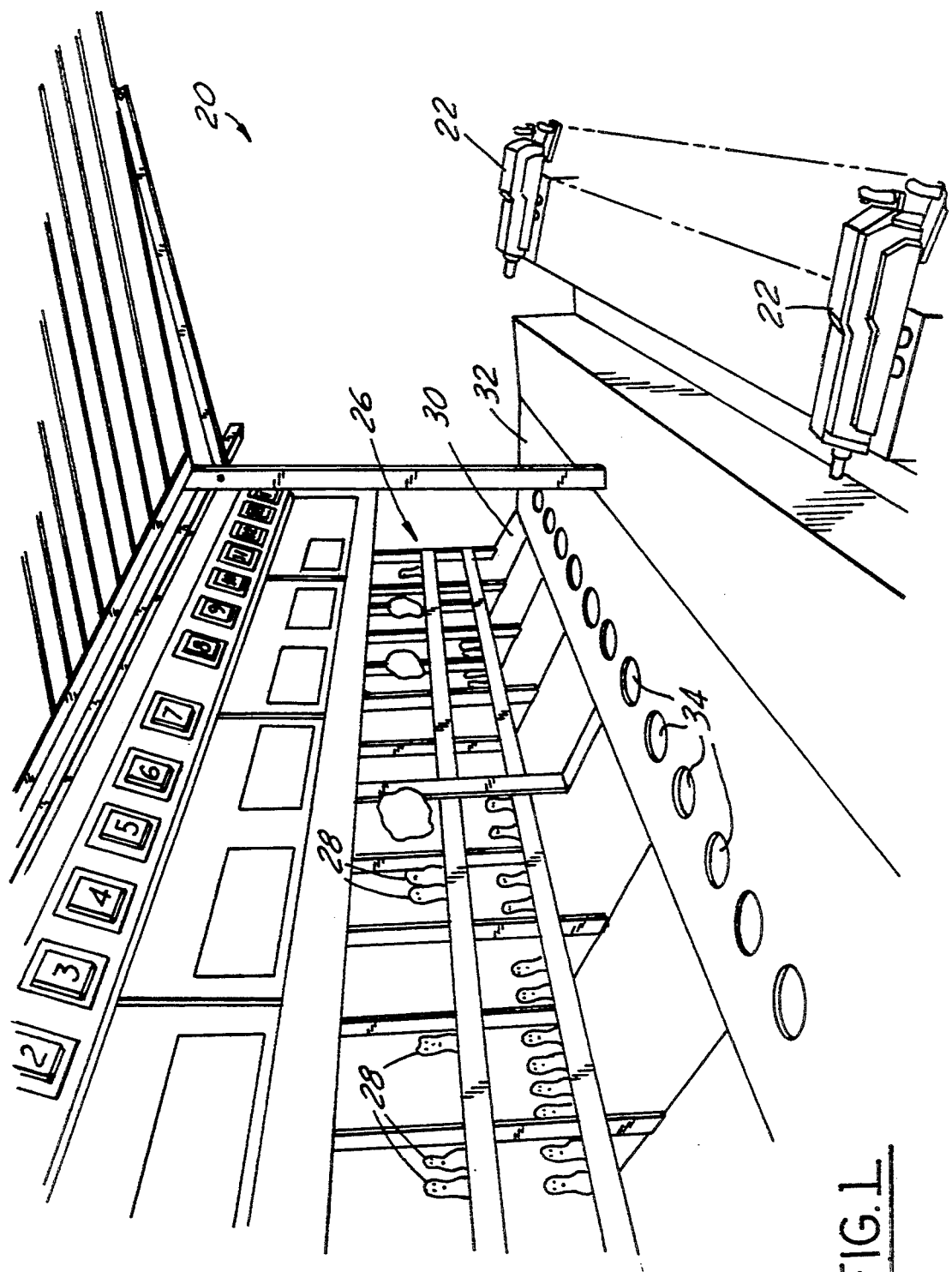
FIG. 1 is a perspective view of a ball game in accordance with one presently preferred embodiment of the invention.

FIG. 1 illustrates a ball game 20 in which a plurality of contestant guns 22 are disposed on a contestant shelf or ledge 24. A target area 26 is disposed in spaced opposition to the array of guns 22, and carries a multiplicity of target elements 28. Target area 26 is effectively divided into a multiplicity of target area sections, each of which is associated with a single gun 22, so that each contestant may direct balls at targets 28 within the assigned target area. Balls shot into target area 26 fall by gravity onto a sloping panel 30, and thence onto a concave panel 32 having a plurality of openings 34 through which the balls drop by gravity.

Figure 2:
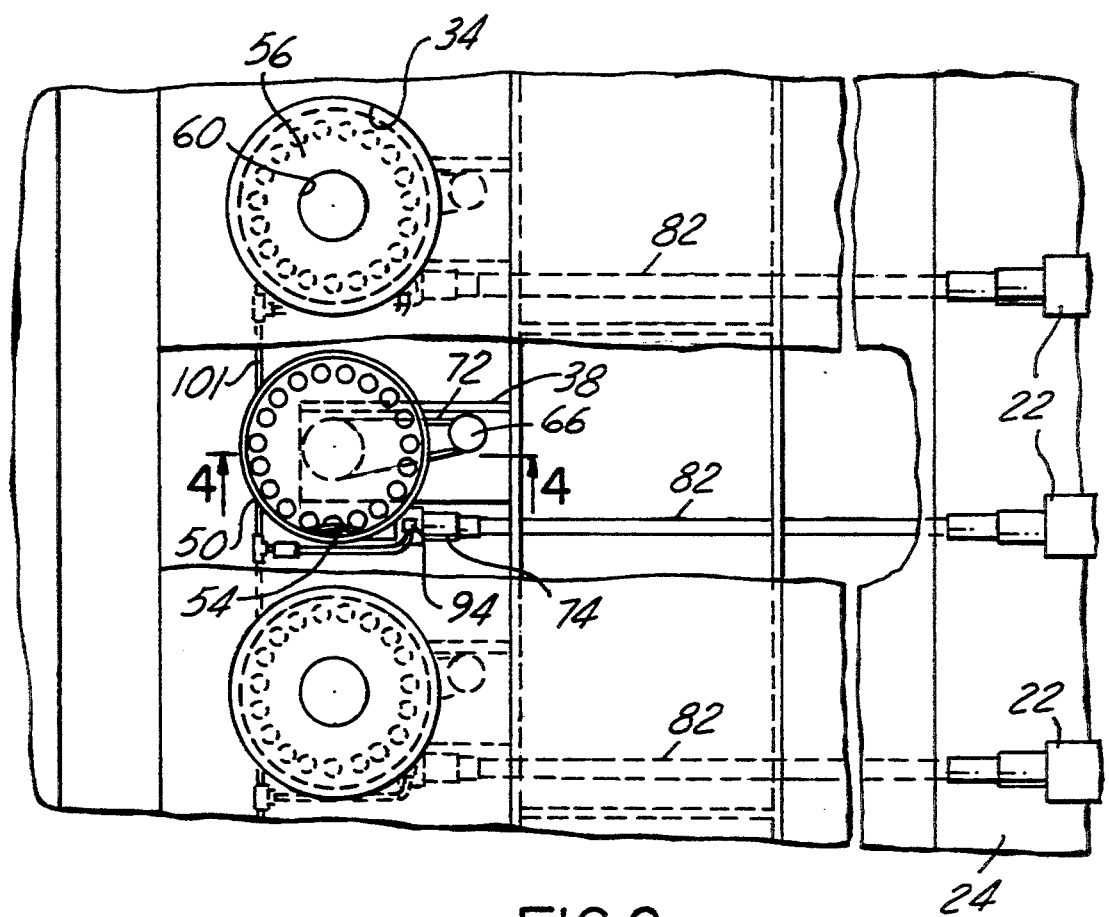
FIG. 2 is a fragmentary plan view of the game illustrated in FIG. 1 with portions broken away to illustrate the turret mechanism for feeding balls to the guns.
Figure 3:
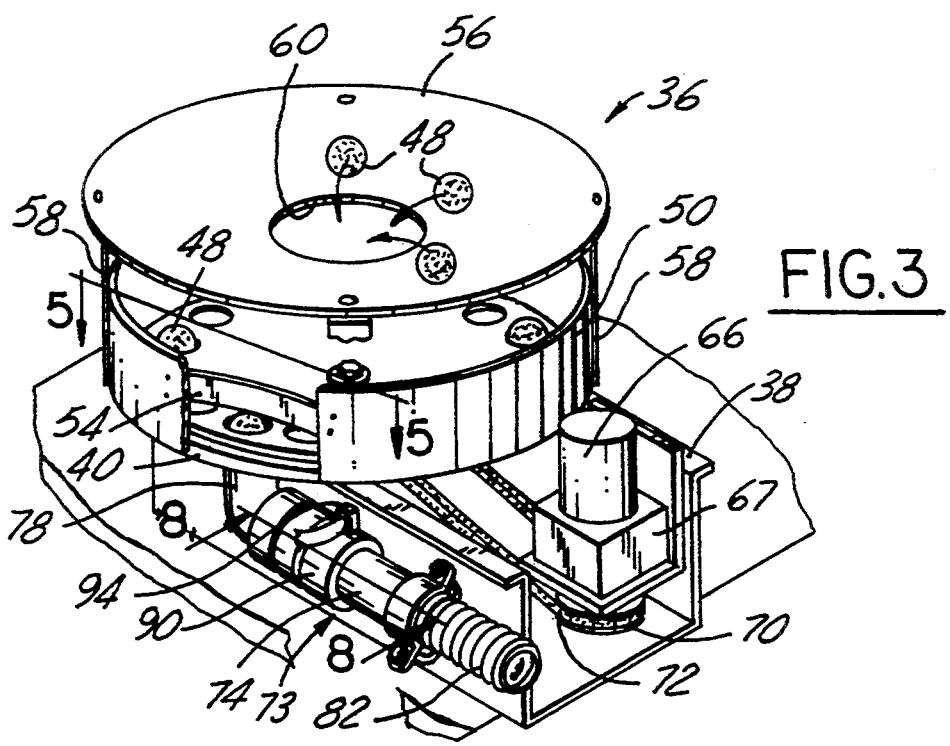
FIG. 3 is a fragmentary perspective view that illustrates the ball turret and accelerator mechanism in accordance with the preferred embodiment of the invention.
Figure 4:
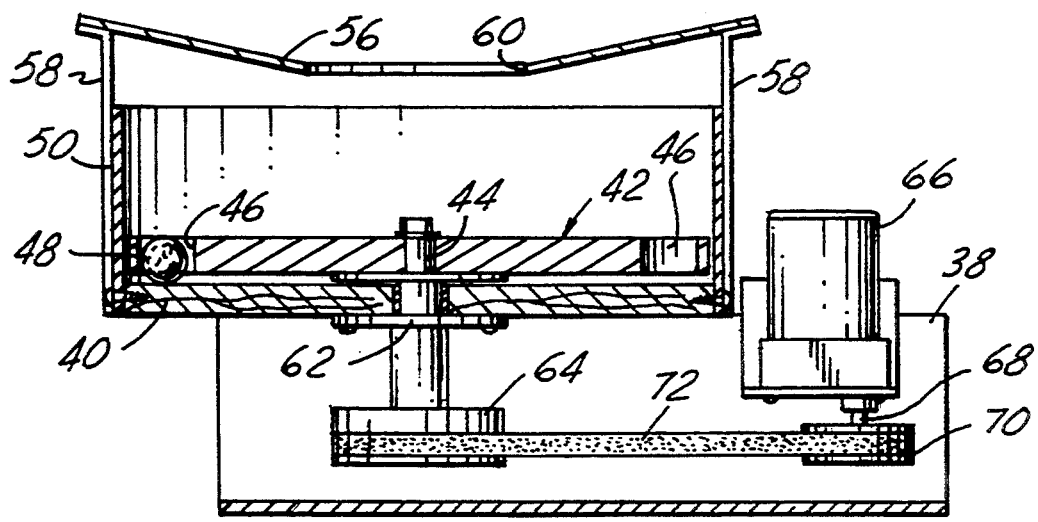
FIG. 4 is a sectional view taken substantially along the line 4—4 in FIG. 2.
Figure 5:
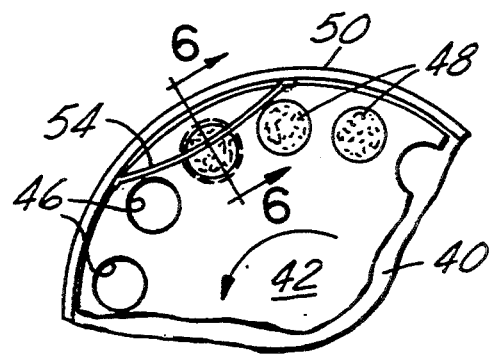
FIG. 5 is a fragmentary sectional view taken substantially along the line 5—5 in FIG. 3.

Referring now to FIGS. 2–4 there is disposed beneath each opening 34 a turret/accelerator assembly 36. A bracket 38 carries a flat circular base 40 in fixed position beneath and generally aligned with each opening 34. A turret 42 in the form of a flat circular plate is coupled to a shaft 44 for free rotation above base 40. Turret 42 has a circumferential array of peripheral through-openings 46 at uniform radius from the axis of shaft 44, and at uniform angular spacing relative to each other around the circumference of turret 42. Each opening 46 is sized to receive a single one of the balls 48. A cylindrical wall 50 is mounted on base 40 surrounding the periphery of turret 42. A arcuate bracket 54 is affixed to wall 50, and extends radially inwardly therefrom so as to overlie the turret through-openings 46 as they pass in turn beneath bracket 54, for purposes to be described. A conical funnel 56 is mounted by angularly spaced legs 58 in fixed position above wall 50. The outer diameter of funnel 56 is greater than the diameter of wall 50 and greater than the diameter of openings 34 (FIG. 1). Funnel 56 has a central opening 60 that overlies and is aligned with the center of turret 42 where it is coupled to shaft 44. Shaft 44 extends through a bearing 62 on base 40 to a pulley 64 beneath the base. A variable speed electric motor 66 with integral gear box 67 is mounted on bracket 38, and has an output shaft 68 that is coupled to a pulley 70. Pulleys 64, 70 are interconnected by a drive belt 72. Thus, turret 42 is rotated by motor 66 at an angular velocity that corresponds to the speed of rotation of the motor reduced by gear box 67.

Figure 10:
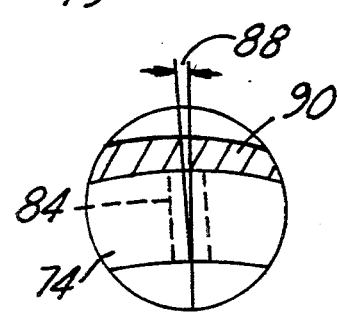
FIG. 10 is a fragmentary view on an enlarged scale of the portion of FIG. 9 contained within the circle 10.
Figure 9:
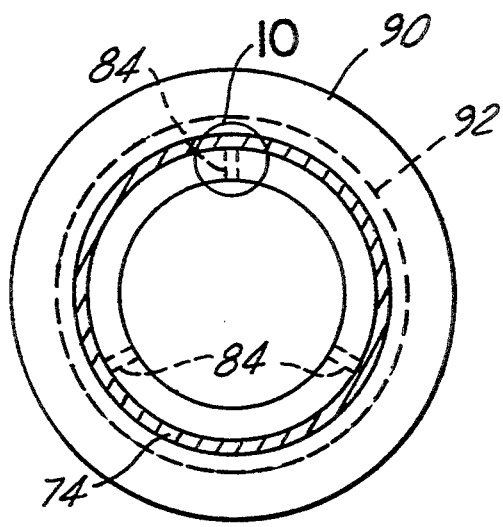
FIG. 9 is a sectional view taken substantially along the line 9—9 in FIG. 8.
Figure 8:
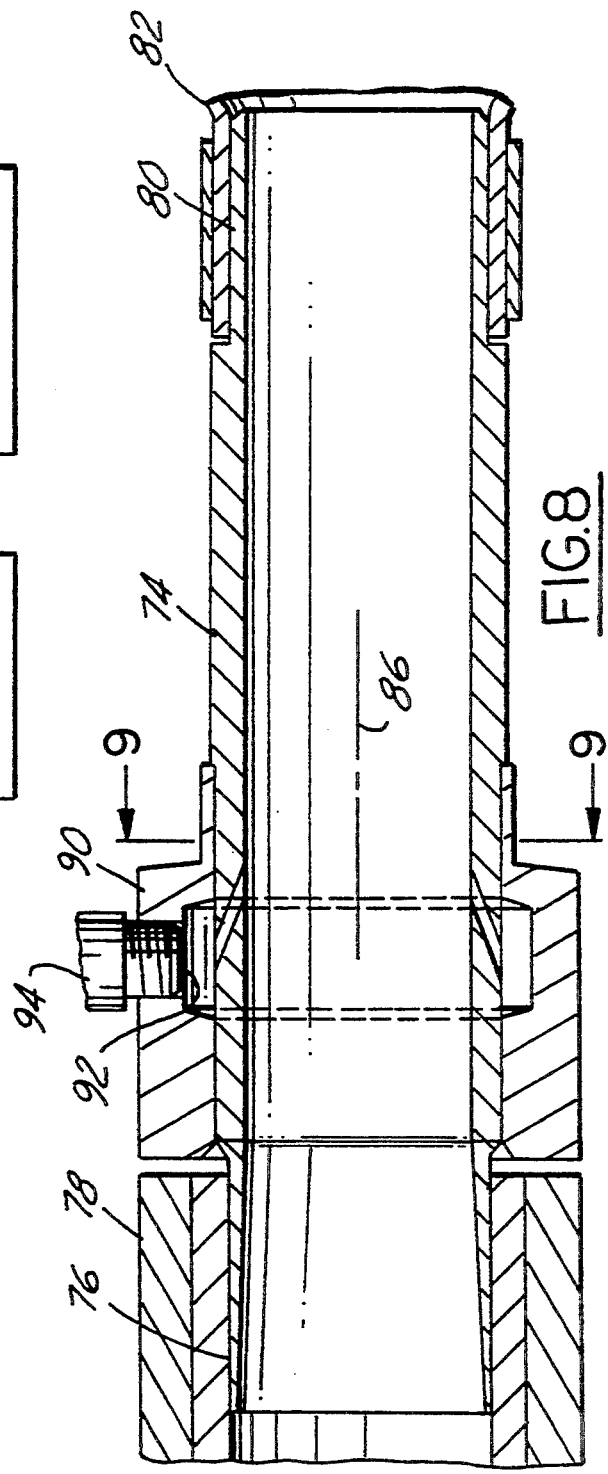
FIG. 8 is a sectional view that bisects the accelerator in the disclosed embodiment of the invention, being taken substantially along the line 8—8 in FIG. 3.

An accelerator assembly 72 (FIGS. 3 and 8–10) is mounted on bracket 38 beneath turret 42. Accelerator assembly 72 comprises a cylindrical tube 74 having an inlet end 76 connected to an elbow 78, which in turn has an inlet end that opens upwardly to an opening 79 in base 40 at a position for alignment with turret openings 46 as they pass in sequence. Tube 74 also has an outlet end 80 that is connected by a flexible hose 82 to a corresponding contestant gun 22, as shown in FIG. 2. Tube 74 has a circumferential array of three air jet passages 84 that extend through the wall of the tube between the inlet and outlet ends 76, 80. As best seen in FIG. 8, air jet passages 84 are at an acute angle to the axis 86 of tube 74 in the direction of tube inlet end 76. Injection of air under pressure through passages 84 thus creates a partial vacuum at the inlet end of the accelerator, and accelerates balls passing therethrough by force of the air pressure. As best seen in FIG. 10, air jet passages 84 are also at a tangential angle 88 to the tube axis, which imparts a spin to the balls as they are accelerated in turn through the tube. Preferably, the acute angle of passages 84 to tube axis 86 is about 21°, and the tangential angle 88 with respect to the tube axis is about 1°. A collar 90 is externally affixed to and surrounds tube 74 overlying the outer ends of air jet passages 84. Collar 90 has an open annular internal recess 92 that is aligned with and opens to the outer ends of passages 84. An air line fitting 94 is carried by collar 90 opening to recess 92 for connection to a source of air under pressure.

Figure 7:
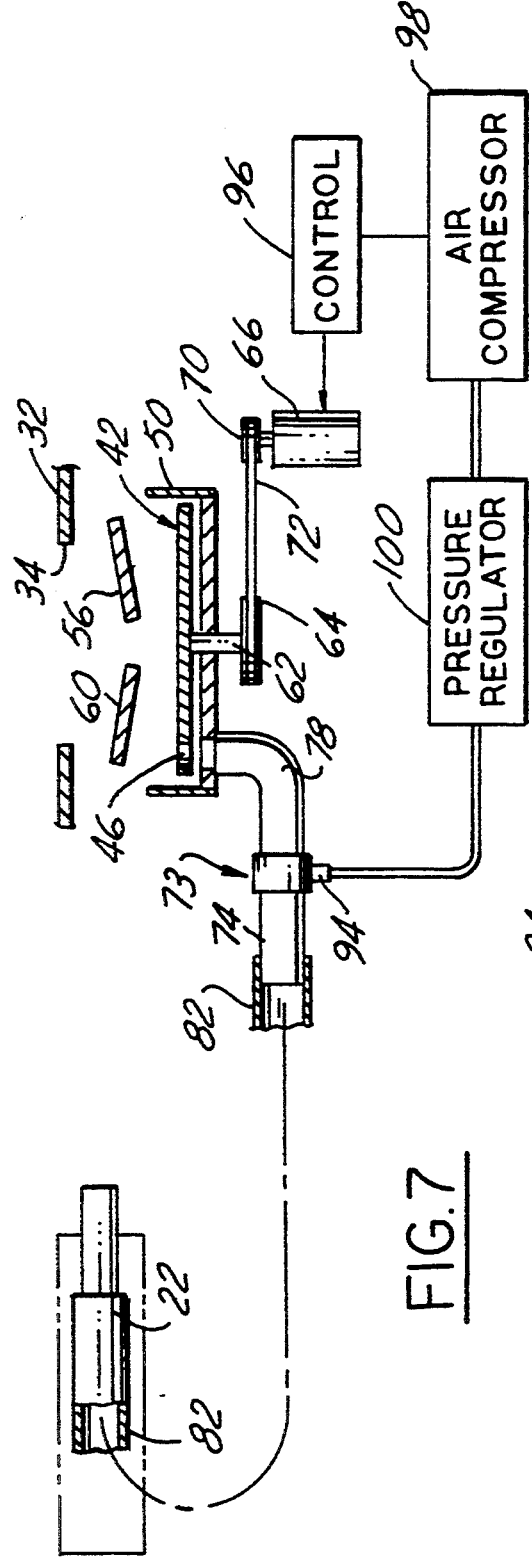
FIG. 7 is a schematic diagram of the game electro-pneumatic control system.

FIG. 7 is a schematic diagram of the electropneumatic control mechanism for a turret/gun combination. Variable speed electric motor 66 is connected to a suitable controller 96 responsive to a game operator for controlling speed of rotation of motor 66 and turret 42, and thus for controlling frequency of presentation of balls under pressure to gun 22. Controller 96 is also connected to an air compressor 98, which in turn is connected through a pressure regulator 100 to air inlet fitting 94 of accelerator 72. Pressure regulator 100 is adjustable for varying acceleration imparted to the balls as they are fed to the gun. As best seen in FIG. 2, a single compressor 98 and regulator 100 operate all accelerators 72 by means of the bronched air pressure line 101.

Figure 6:
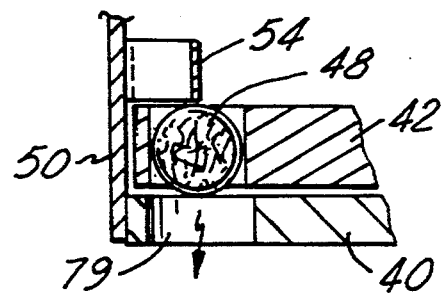
FIG. 6 is a fragmentary sectional view taken substantially along the line 6—6 in FIG. 5.

In operation, balls that fall by gravity through panel openings 34 (FIG. 1) are fed by funnel 56 to the center portion of turret 42. As turret 42 is rotated by motor 66, the balls migrate by centrifugal force toward the periphery of the turret, and one ball drops into each turret peripheral opening 46. As each turret opening 46 moves into alignment with base opening 79, the ball 48 carried in that turret opening drops downwardly through opening 79 by the combined force of gravity and suction from accelerator 72. The ball is rapidly accelerated as it travels through accelerator 73 due to the air pressure and flow through passages 84, while a slight spin is imparted thereto as described above. Bracket 54 is disposed above opening 79 closely adjacent to turret 42, as shown in FIG. 6. Bracket 54 thus functions both to prevent additional balls from dropping through turret 42 to accelerator 73.

The conveyor system may be employed for other applications, such as in the packaging industry.

I claim:

1. In a ball game that includes a target area, at least one gun responsive to an operator for firing balls into said target area, and means for feeding balls in sequence to said gun, the improvement wherein said means comprises:

an opening beneath said target area for receiving balls that fall by gravity from said target area, a turret positioned beneath said opening and having a circumferential array of peripheral openings each sized to receive one of the balls, means for rotating said turret about an axis such that balls that fall onto said turret are urged by centrifugal force toward said peripheral openings, an accelerator having a ball inlet disposed beneath said turret at a position for alignment with each said peripheral opening in sequence as said turret rotates, an outlet and an air inlet, a source of air under pressure connected to said air inlet, said accelerator being so constructed that flow of air under pressure from said air inlet to said outlet assists force of gravity in drawing balls from said peripheral openings in turn and accelerate the balls toward said outlet, and means connecting said accelerator outlet to said gun so as to feed to said gun balls accelerated in sequence by said accelerator.

2. The game set forth in claim 1 further comprising a funnel positioned above said turret for feeding balls that fall by gravity through said opening onto said turret radially inwardly of said peripheral openings, the balls migrating by centrifual force radially outwardly on said turret toward said peripheral openings.

3. The game set forth in claim 2 wherein said turret comprises a flat circular plate, said peripheral openings being of uniform size and spacing and at uniform radius from said axis.

4. The game set forth in claim 3 further comprising a cylindrical wall surrounding the periphery of said turret to prevent balls from falling off of said turret.

5. The game set forth in claim 4 further comprising means on said wall aligned with said accelerator ball inlet to prevent passage of more than one ball to said accelerator through each peripheral opening as it aligns with said accelerator inlet.

6. The game set forth in claim 1 wherein said accelerator comprises a cylindrical tube having a central axis, means at one end of said tube forming said ball inlet, means at an opposing end of said tube forming said outlet, a plurality of air jet passages extending through said tube between said inlet means and said outlet means, and means for connecting said plurality of air jet passages to said air inlet.

7. The game set forth in claim 6 wherein said plurality of air jet passages are disposed at uniform angular spacing around said tube.

8. The game set forth in claim 7 wherein said plurality of air jet passages are at an acute angle to said tube axis in the direction of said inlet means.

9. The game set forth in claim 8 wherein said plurality of air jet passages are at an angle tangential to said tube axis for imparting spin to the balls as they are accelerated in turn through said tube.

10. The game set forth in claim 9 wherein said acute angle is 21°.

11. The game set forth in claim 10 wherein said tangential angle is 1°.

12. The game set forth in claim 8 wherein said means for connecting said plurality of air jet passages to said air inlet comprises a collar externally affixed to said tube surrounding said passages, said collar having an open internal recess communicating with said passages.

13. The game set forth in claim 12 wherein said air inlet comprises an air line fitting on said collar opening into said recess.

14. The game set forth in claim 1 wherein said source of air under pressure comprises a compressor having an outlet connected to said air inlet.

15. The game set forth in claim 14 further comprising a pressure regulator connected between said compressor outlet and said air inlet for adjusting air pressure fed to said air inlet, and thereby adjusting acceleration imparted to the balls during passage through said accelerator.

16. The game set forth in claim 1 wherein said means for rotating said turret comprises an electric motor.

17. The game set forth in claim 16 wherein said electric motor comprises a variable speed electric motor, and wherein said game further comprises means for adjusting speed of said motor and thereby adjusting timing between balls fed to said gun.

18. The game set forth in claim 1 wherein said means connecting said accelerator outlet to said gun comprises a length of flexible hose.

19. The game set forth in claim 1 wherein there are a plurality of said guns, and a corresponding plurality of said means for feeding balls to said guns individually associated with said guns.

20. An air conveyor system that comprises:
means for receiving objects to be conveyed,
a turret positioned beneath said means and having a circumferential array of peripheral openings each sized to receive one of such objects,
means for rotating said turret about an axis such that objects that fall onto said turret are urged by centrifugal force toward said peripheral openings,
an accelerator having a main inlet disposed beneath said turret at a position for alignment with each said peripheral opening in sequence as said turret rotates, an outlet and an air inlet,
a source of air under pressure connected to said air inlet, said accelerator being so constructed that flow of air under pressure for said air inlet to said outlet assists force of gravity in drawing objects from said peripheral openings in turn and accelerates the objects toward said outlet, and
means connected to said accelerator outlet for receiving objects accelerated in sequence by said accelerator.

* * * * *